United States Patent
Taniguchi et al.

(10) Patent No.: US 10,340,748 B2
(45) Date of Patent: Jul. 2, 2019

(54) WIRELESS POWER SUPPLY APPARATUS, WIRELESS POWER RECEIVING TERMINAL, AND WIRELESS POWER SUPPLY METHOD

(71) Applicant: KABUSHIKI KAISHA TOSHIBA, Minato-ku, Tokyo (JP)

(72) Inventors: Kentaro Taniguchi, Kanagawa (JP); Ryoko Matsuo, Tokyo (JP); Toshiyuki Ogawa, Kanagawa (JP)

(73) Assignee: KABUSHIKI KAISHA TOSHIBA, Minato-Ku, Tokyo (JP)

( * ) Notice: Subject to any disclaimer, the term of this patent is extended or adjusted under 35 U.S.C. 154(b) by 0 days.

(21) Appl. No.: 15/909,501

(22) Filed: Mar. 1, 2018

(65) Prior Publication Data
US 2019/0157912 A1    May 23, 2019

(30) Foreign Application Priority Data
Nov. 22, 2017   (JP) .................................. 2017-224733

(51) Int. Cl.
| H02J 50/20 | (2016.01) |
| H02J 7/02  | (2016.01) |
| H02J 50/90 | (2016.01) |
| H02J 50/80 | (2016.01) |

(52) U.S. Cl.
CPC ............. H02J 50/20 (2016.02); H02J 7/025 (2013.01); H02J 50/80 (2016.02); H02J 50/90 (2016.02)

(58) Field of Classification Search
CPC .. H02J 50/20; H02J 50/80; H02J 50/90; H02J 7/25
See application file for complete search history.

(56) References Cited

U.S. PATENT DOCUMENTS

| 8,207,847 B2 | 6/2012 | Yamasuge |
| 2010/0036773 A1* | 2/2010 | Bennett .............. G06Q 20/3674 705/67 |
| 2017/0208597 A1* | 7/2017 | Gollakota ............... H04L 12/10 |

FOREIGN PATENT DOCUMENTS

JP           4572949 B2    11/2010

* cited by examiner

*Primary Examiner* — Nay A Maung
*Assistant Examiner* — Angelica M Perez
(74) *Attorney, Agent, or Firm* — Foley & Lardner LLP

(57) ABSTRACT

An electronic apparatus includes a transmitter circuitry, receiver circuitry, and controller circuitry. The transmitter circuitry is configured to transmit a first wireless signal for a wireless communication to a first terminal via a first frequency. The receiver circuitry is configured to receive a second wireless signal for the wireless communication from the first terminal via the first frequency. The controller circuitry is configured to detect position information of the first terminal based on the second wireless signal and form a beam pattern of radio waves of a second frequency different from the first frequency based on the position information, the beam pattern having directivity to the first terminal. And the transmitter circuitry is further configured to wirelessly supply power to the first terminal via the second frequency during the wireless communication with the first terminal.

6 Claims, 8 Drawing Sheets

WIRELESS POWER SUPPLY APPARATUS, WIRELESS POWER RECEIVING TERMINAL, AND WIRELESS POWER SUPPLY METHOD

CROSS-REFERENCE TO RELATED APPLICATIONS

This application is based upon and claims the benefit of priority from Japanese Patent Application No. 2017-224733, filed on Nov. 22, 2017, the entire contents of which are incorporated herein by reference.

FIELD

Embodiments described herein relate to a wireless power supply apparatus, wireless power receiving terminal, and a wireless power supply method.

BACKGROUND

With the advance of Internet of Things (IoT) in the current society, various small wireless communication devices are spreading. Along with this trend, various low power consumption devices such as one for remote monitoring in a factory or wireless tags carried by elderly people and children to inform their locations are becoming widespread. Accordingly, techniques of wirelessly supplying power to these devices have been widely developed. As a technique of automatically supplying power, there is a known technology of supplying power wirelessly using radio waves. For example, there is a technology of communicating between a power supply apparatus and a power receiving terminal to detect an arrival angle of the radio waves so as to control a power supply signal beam. In this case, there is a study of a technique to estimate a direction of the arrival of the radio waves at the timing of receiving the signal from the power receiving terminal on the power supply apparatus, and thereafter direct the power supply signal beam toward the estimated direction.

Such a power supply apparatus, however, performs power supply after estimating the direction via wireless communication. That is, wireless communication and wireless power supply need to be performed serially. This makes it difficult to perform wireless communication during wireless power supply, which is inefficient compared with a case of simultaneously performing both wireless communication and wireless power supply. In addition, there is a need to transmit a position estimation signal for estimating the direction of arrival, consuming extra time and power correspondingly. Furthermore, it is necessary to provide an antenna for power supply separately from the antenna for communication.

DETAILED DESCRIPTION

According to one embodiment, an electronic apparatus includes a transmitter circuitry, receiver circuitry, and controller circuitry. The transmitter circuitry is configured to transmit a first wireless signal for a wireless communication to a first terminal via a first frequency. The receiver circuitry is configured to receive a second wireless signal for the wireless communication from the first terminal via the first frequency. The controller circuitry is configured to detect position information of the first terminal based on the second wireless signal and form a beam pattern of radio waves of a second frequency different from the first frequency based on the position information, the beam pattern having directivity to the first terminal. And the transmitter circuitry is further configured to wirelessly supply power to the first terminal via the second frequency during the wireless communication with the first terminal.

Hereinafter, the present embodiment will be described in detail with reference to the drawings.

First Embodiment

Low power consumption devices often perform wireless communication in a congested frequency band such as the Industrial, Scientific and Medical (ISM) band. Therefore, performing wireless power supply using the same frequency as the wireless communication would allow a power supply signal to be a source of interference to surrounding equipment. Moreover, since the band is congested, it is difficult to control the timing related to power supply, leading to a problem of difficulty in achieving a desired power supply effect. Therefore, in the present embodiment, a wireless power supply apparatus to perform wireless power supply using a frequency other than the frequency used for wireless communication will be described. While the following description includes the terms of position estimation, direction estimation, and orientation estimation, they are merely used contextually, and are not substantially different from the description of the present embodiment.

Figure 1:
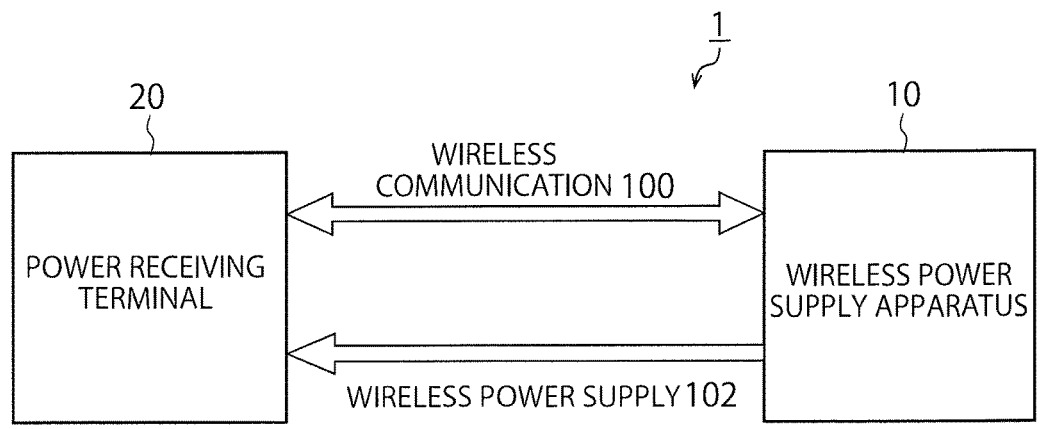
FIG. 1 is a diagram schematically illustrating a wireless power supply system including a wireless power supply apparatus according to an embodiment.

FIG. 1 is a diagram illustrating a wireless power supply system 1 according to the present embodiment. The wireless power supply system 1 includes a wireless power supply apparatus 10 and a power receiving terminal 20 (first terminal). The power receiving terminal 20 can receive power wirelessly supplied from the wireless power supply apparatus 10 to charge a built-in storage battery or the like.

The wireless power supply apparatus 10 and the power receiving terminal 20 wirelessly communicate with each other (first wireless communication) using radio waves of a first frequency 100. While performing wireless communication, the wireless power supply apparatus 10 supplies power to the power receiving terminal 20 using radio waves of a second frequency 102. In this manner, wireless communication is performed at the first frequency 100, while wireless power supply is performed at different timings or at the same timing at the second frequency 102.

Figure 2:
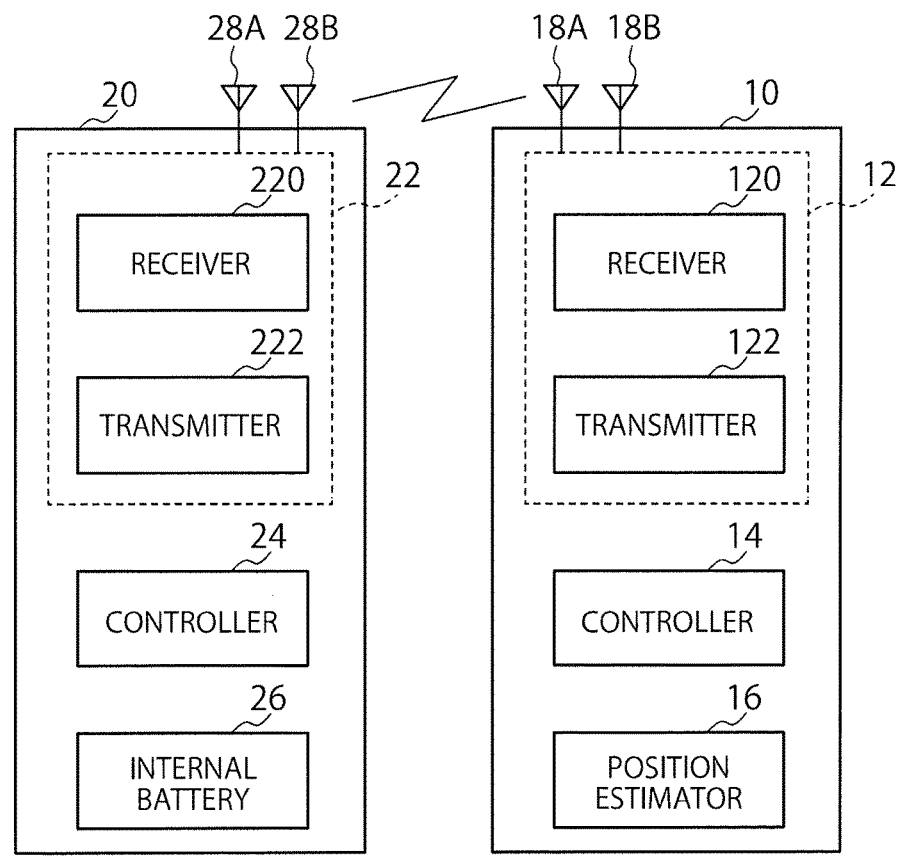
FIG. 2 is a block diagram illustrating a function of a wireless power supply apparatus and a power receiving terminal according to an embodiment.

FIG. 2 is a block diagram schematically illustrating functions of the wireless power supply apparatus 10 and the power receiving terminal 20. The wireless power supply apparatus 10 includes a communicator 12, a controller 14, and a position estimator 16.

The communicator 12 includes a receiver 120 and a transmitter 122, and performs wireless communication of the wireless power supply apparatus 10. The communicator 12 may be connected to an antenna 18A that performs communication at the first frequency and may be connected to an antenna 18B that performs communication at the second frequency. Depending on the frequency band to be used, the antenna 18A and the antenna 18B may have a same configuration, and one common antenna may be used for the first frequency band and the second frequency band. As another example, even in the same frequency band, it is allowable to provide the antenna separately for the receiver 120 and the antenna for the transmitter 122.

The receiver 120 receives a radio signal transmitted from the outside. The transmitter 122 transmits a radio signal to the outside. It is assumed that a signal to be transmitted to the outside includes a signal for power supply. While the following description is a case where the controller 14 and the position estimator 16 are separate components from the transmitter 122, generation of signals related to power supply such as position estimation and beam pattern formation may also be performed by the transmitter 122.

The controller 14 controls the wireless power supply apparatus 10. The control includes transmission and reception of a signal and formation of a beam pattern for supplying power to the power receiving terminal 20 using the second frequency band, for example. Moreover, the controller 14 may perform switching between the antennas 18A and 18B, and the receiver 120 and the transmitter 122.

A problem of the wireless power supply using radio waves is a small amount of power to be supplied. For example, in a case where power is supplied in the 2.4 GHz band, the power transmitted from the power supply side is greatly attenuated in the space to decrease the power level to 1% or less at a propagation distance of 1 m. As a measure against this problem, there is a transmission beam control. This is a technology for enhancing the reception power level in the power receiving terminal 20 by controlling the radiation beam pattern of radio waves on the side of the wireless power supply apparatus 10 performing the wireless power supply. As a method of forming the transmission beam pattern to have directivity in a direction of the power receiving terminal 20, there are two exemplary conceivable means.

In a first means, the wireless power supply apparatus 10 detects the position or direction of the power receiving terminal 20 and have the directivity in that direction. The second means is to grasp propagation path characteristics between the wireless power supply apparatus 10 and the power receiving terminal 20 and to form a beam pattern to cancel the influence of the propagation path. The controller 14 of the wireless power supply apparatus 10 controls the formation of such a beam pattern. In general, the propagation path characteristics of wireless communication have mutual difference in characteristics depending on the frequency band to be used. Therefore, in a case of using the second means, there is a need to grasp the propagation path characteristics of the frequency band used for wireless power supply. In the present embodiment, exemplary beam pattern formation achievable without grasping such propagation path characteristics will be described.

The position estimator 16 estimates the position of the power receiving terminal 20. Position estimation may be performed, for example, such that the power receiving terminal 20 obtains its own position information via a position detector such as global positioning system (GPS) and transmits a result to the wireless power supply apparatus 10, whereby the position estimator 16 estimates a relative position of the power receiving terminal 20 from the wireless power supply apparatus 10. In a case where the power receiving terminal 20 has difficulty in obtaining its own position information, the position estimator 16 uses the radio signal received by the receiver 120 of the wireless power supply apparatus 10 from the power receiving terminal 20 to estimate the direction in which the power receiving terminal 20 exists.

The power receiving terminal 20 includes a communicator 22, a controller 24, and an internal battery 26.

The communicator 22 includes a receiver 220 and a transmitter 222, and performs wireless communication of the power receiving terminal 20. The communicator 22 may be connected to the antenna 28A to perform communication at the first frequency and the antenna 28B to receive at least radio waves of the second frequency. Similarly to the antennas 18A and 18B of the wireless power supply apparatus 10, it is possible to allow the antennas 28A and 28B to have a same configuration depending on the frequency band to be used, and to configure with one antenna shared by the first frequency band and the second frequency band.

The controller 24 controls the power receiving terminal 20. While various devices can be included as the power receiving terminal 20, in a case where it is a sensor, for example, control on sensing of the sensor may be performed by the controller 24. For example, in a case where the power receiving terminal 20 is a communication device such as a beacon, control of communication with the beacon or the like may be performed. Of course, control of the communicator 22 that communicates with the wireless power supply apparatus 10 may be performed. In addition, in a case where the receiver 220 receives a power supply signal, control for charging the internal battery 26 may be performed.

The internal battery 26 is a battery that stores power of the power receiving terminal 20. The power receiving terminal 20 achieves its function using the power charged in the internal battery 26. Examples of the internal battery 26 include a lithium ion battery, a nickel hydrogen battery, and a nickel cadmium battery, which are rechargeable and relatively suitable for miniaturization. The present invention is not limited to the above examples and may be a battery or a capacitor capable of storing sufficient power with respect to the power consumption of the power receiving terminal 20.

Figure 3:
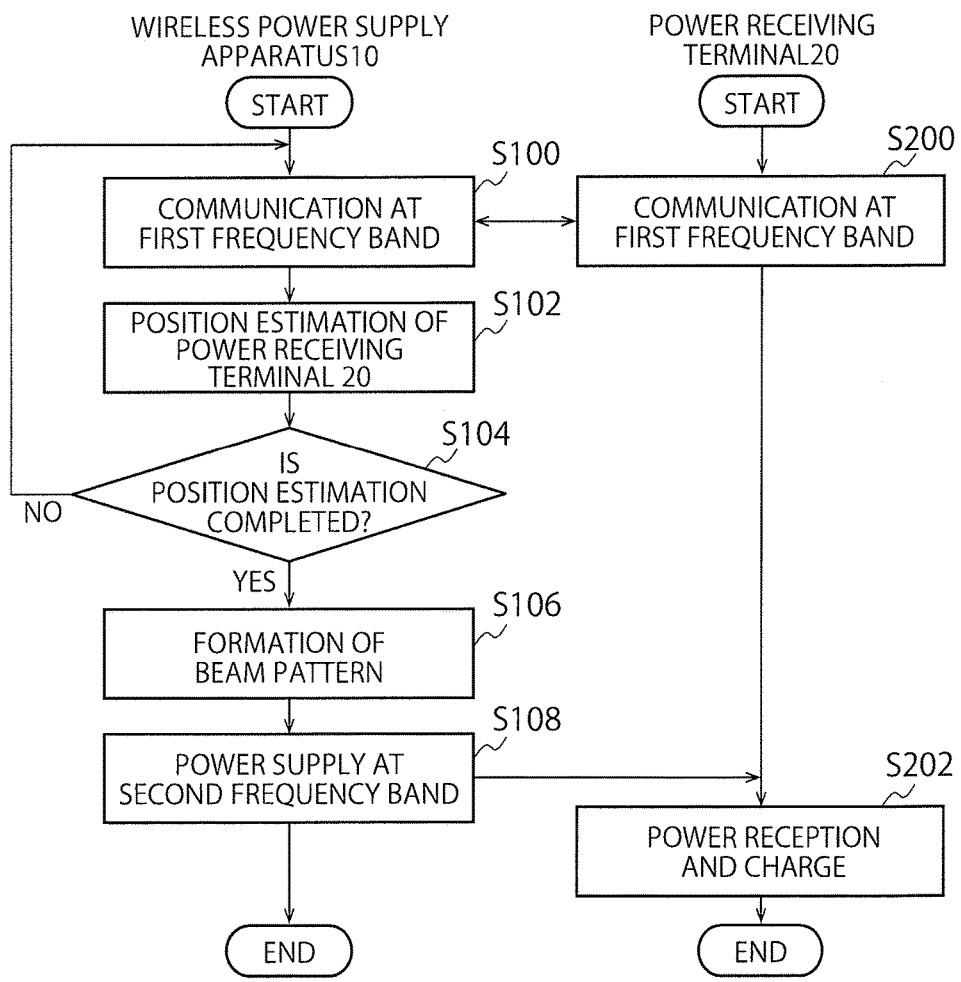
FIG. 3 is a flowchart illustrating processing of a wireless power supply apparatus and a power receiving terminal according to an embodiment.

FIG. 3 is a flowchart illustrating a flow of processing of the wireless power supply apparatus 10 and the power receiving terminal 20 according to the present embodiment.

The wireless power supply apparatus 10 and the power receiving terminal 20 communicate with each other using the first frequency band (S100 and S200). For example, in a case where the power receiving terminal 20 is a sensor, communication is performed such that sensor information or the like sensed by the power receiving terminal 20 is transmitted to the wireless power supply apparatus 10. At this timing, the wireless power supply apparatus 10 collects information for estimating the position of the power receiving terminal 20 while performing communication at the first frequency band.

Next, the position estimator 16 estimates the position of the power receiving terminal 20 (S102). In a case where the power receiving terminal 20 includes a position detector, the power receiving terminal 20 transmits the position information of the power receiving terminal 20 detected by the position detector to the wireless power supply apparatus 10 via the transmitter 222, and the wireless power supply apparatus 10 estimates the position of the power receiving terminal 20 on the basis of the received position information. In a case where the power receiving terminal 20 has no position detector, the position estimation is performed by the following method, for example.

Figure 4:
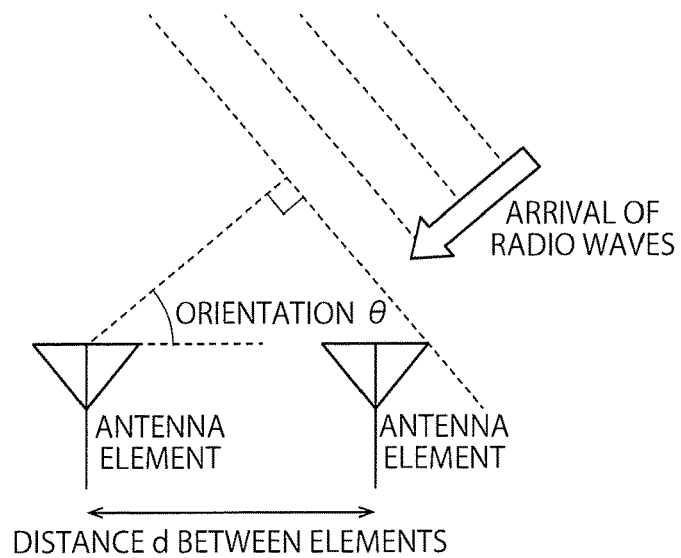
FIG. 4 is a diagram illustrating an example of direction estimation according to an embodiment.

FIG. 4 is a diagram illustrating an exemplary implementation of position estimation. This is the case where the wireless power supply apparatus 10 includes an array antenna as the antenna 18A. With this type of array antenna, the arrival direction of radio waves transmitted from the power receiving terminal 20 is estimated.

That is, when a distance between the antenna elements of the first frequency array antenna included in the wireless power supply apparatus 10 is d, and the radio waves arrive from an orientation θ, the expression of d·cos (θ)=c·ΔT holds. Herein, c is the speed of light and ΔT is a difference in reception time between antenna elements. When the phase difference of the received signal between the antenna elements is Δψ, the expression Δψ=2π·f·ΔT holds. Herein, f is the frequency of the received signal. From these expressions, the direction θ of arrival of the radio waves of the first frequency from the power receiving terminal 20 is given by θ=Arccos (c·ΔT/d)=Arccos (f·λ·ΔT/d)=Arccos (λ·Δψ/(2π·d)). Herein, λ represents the wavelength of an incoming signal, Arccos (•) is a function representing a principal value of an arc cosine function.

In a case where the frequency of the signal is single, that is, the radio waves are continuous waves (CW), the wavelength can be uniquely obtained from the frequency. In contrast, in the case of the modulated signal, the wider the bandwidth of the signal, the wider the available wavelength, widening the arrival direction calculated by the above-described expression. From this, it is preferable to use a signal with a narrow bandwidth in order to increase the estimation accuracy of the direction. From the above expression, the information needed for the direction estimation processing is the wavelength of the signal, the phase difference, and the distance between the antenna elements. That is, implementation of such estimation would not need to send a special signal for direction estimation, and it is possible to secondarily estimate the direction using the phase difference of the received signal in ordinary wireless communication.

Figure 5:
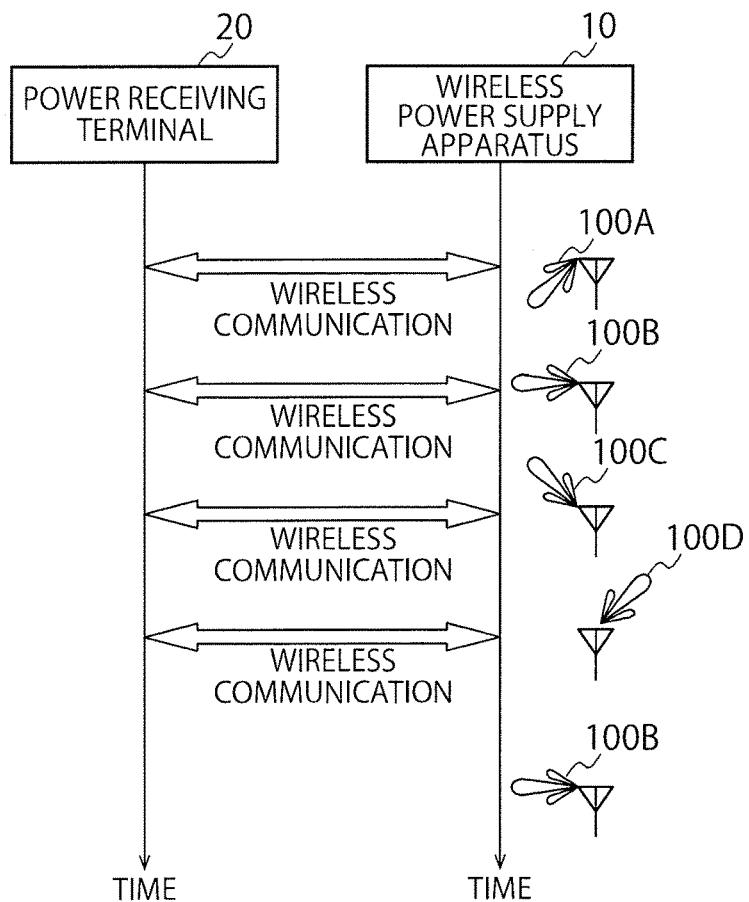
FIG. 5 is a diagram illustrating an example of direction estimation according to an embodiment.

FIG. 5 is a diagram illustrating another exemplary implementation of position estimation. The wireless power supply apparatus 10 includes a variable directivity antenna as the antenna. In this case, the wireless power supply apparatus 10 can switch the directivity of the antenna electronically or mechanically. For example, as illustrated in FIG. 5, signals are received by antennas having directivity corresponding to the radio waves transmitted from different directions, such as directivity examples 100A, 100B, 100C, and 100D.

Figure 6:
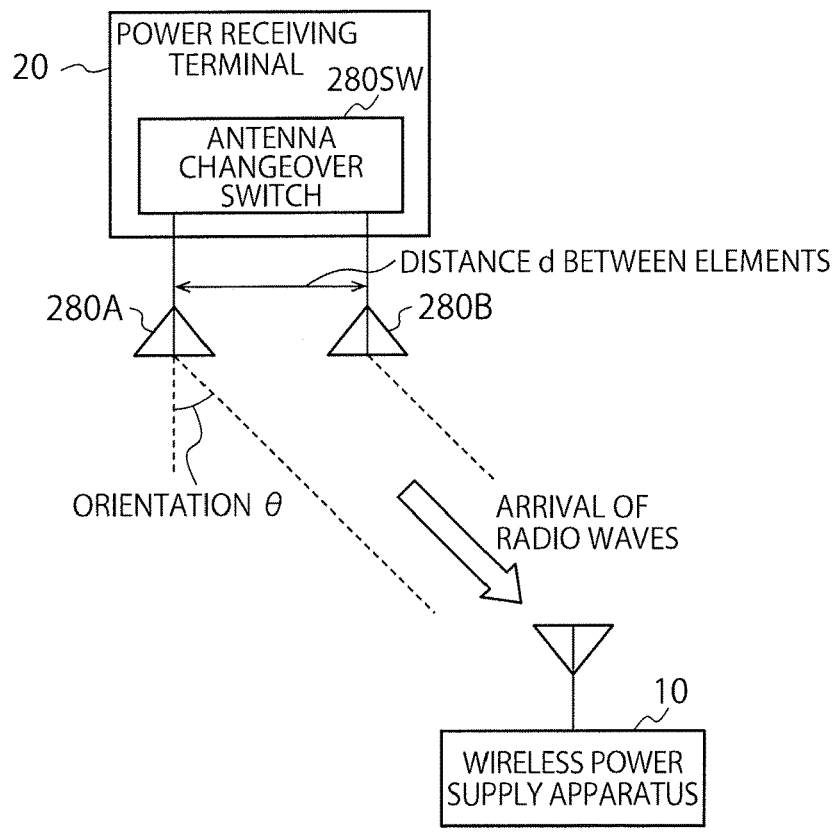
FIG. 6 is a diagram illustrating an example of direction estimation according to an embodiment.

Then, it is determined that the power receiving terminal 20 exists in a direction corresponding to the directivity with excellent characteristics. Here, the characteristics represent reception sensitivity, reception power, or other communication characteristics. For example, with a directional antenna for the first frequency, it is possible to detect the direction of radio waves of the first frequency transmitted from the power receiving terminal 20. Note that the direction can be changed in various directions in addition to the direction illustrated in the drawing FIG. 6 is a diagram illustrating still another exemplary implementation of position estimation. The power receiving terminal 20 includes a plurality of antennas, while the wireless power supply apparatus 10 includes a single antenna. In such a case, it is possible to estimate the direction θ of emission of the radio waves as follows.

The power receiving terminal 20 includes a plurality of antennas 280A and 280B that transmit and receive the first frequency, and further includes an antenna changeover switch 280SW. The power receiving terminal 20 switches antennas that transmit radio waves of the first frequency at a known timing. The wireless power supply apparatus 10 sequentially receives the signals from individual antenna elements and calculates the direction θ of emission of the radio waves. Herein, it is assumed that the wireless power supply apparatus 10 has information of a distance d between the antenna elements and of a transmission interval of signals from each of the elements.

In this case, a relational expression of d·sin (θ)=c·ΔT' holds. Herein, ΔT' is a propagation time difference between the signal from the antenna 280A and the signal from the antenna 280B. When the phase difference between the signal from the antenna 280A and the signal from the antenna 280B is Δψ', the relational expression Δψ'=2π·f·ΔT' holds.

From these two expressions, it can be calculated as θ=Arcsin (c·ΔT/d)=Arcsin (f·λ·ΔT'/d)=Arcsin (λ·Δψ'/(2π·d)). Herein, Arcsin takes a main value of the inverse sine function.

The above-described means enables the wireless power supply apparatus 10 to estimate the direction of the power receiving terminal 20. As described above, the position information may be estimated in a form of estimation of the position itself of the power receiving terminal 20 from an output result of the position information detecting device, or the like mounted on the power receiving terminal 20, or estimation of the direction of the power receiving terminal 20 from the wireless power supply apparatus 10. That is, information used in the estimation may be information related to the position of the power receiving terminal 20 that enables the wireless power supply apparatus 10 to transmit a power supply signal appropriately to the power receiving terminal 20.

Returning to FIG. 3, the wireless power supply apparatus 10 next determines whether the position estimation is completed (S104). In a case where the position estimation has not been completed (S104: No), for example, communication is performed until the phase difference $\Delta\psi$ can be measured in FIG. 4, until a direction with an excellent characteristic can be found in FIG. 5, or until the phase difference $\Delta\psi'$ can be measured in FIG. 6, so as to perform position estimation processing.

In contrast, in a case where the position estimation is completed (S104: Yes), the controller 14 forms a beam pattern (S106). This beam pattern is formed by radio waves at the second frequency and is generated so as to have directivity in the estimated direction.

Then, the transmitter 122 of the wireless power supply apparatus 10 transmits radio waves of the second frequency according to the beam pattern formed by the controller 14 toward the power receiving terminal 20 to supply power to the power receiving terminal 20 (S108). This control is performed mechanically or electronically.

The receiver 220 of the power receiving terminal 20 that has received the radio waves of the second frequency from the wireless power supply apparatus 10 is controlled by the controller 24 such that that the internal battery 26 is charged (S202). While the communication at the first frequency is performed at the first step in the flowchart of FIG. 3, this is not limited to this example, and communication may be performed at all times or as frequently as necessary. In a case where power is supplied while performing this communication, the processing illustrated in this flowchart is performed.

Figure 7:
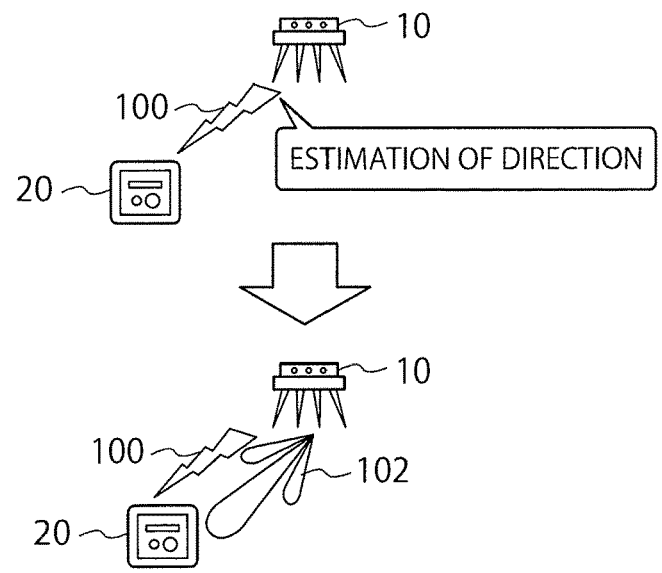
FIG. 7 is a diagram schematically illustrating wireless communication and wireless power supply according to an embodiment.

FIG. 7 is a diagram illustrating a state of performing this wireless communication and wireless power supply at the same timing. The wireless power supply apparatus 10 estimates the position (direction) of the power receiving terminal 20 with respect to the wireless power supply apparatus 10 before the timing of power supply. As described above, this position estimation is performed using the radio waves of the first frequency 100.

After the position estimation is performed, the wireless power supply apparatus 10 wirelessly communicates with the power receiving terminal 20 using the radio waves of the first frequency 100, and together with this, supplies power to the power receiving terminal 20 using radio waves with a beam pattern having directivity of the second frequency 102. This enables the power receiving terminal 20 to receive power by radio waves of the second frequency 102 at the same timing as wireless communication with the radio waves of the first frequency 100 so as to charge the internal battery 26.

As described above, according to the present embodiment, the first frequency 100 used for wireless communication and the second frequency 102 used for wireless power supply are mutually different frequencies, making it possible to perform wireless power supply while performing wireless communication. Moreover, since the mutually different frequencies are used, it is possible to reduce the possibility that radio waves used in wireless power supply cause interference with wireless communication. Furthermore, since the direction of the power receiving terminal 20 is estimated using wireless communication, and wireless power supply having directivity in the estimated direction is performed, it is possible to enhance power supply efficiency.

Second Embodiment

While the above-described first embodiment is a case where the wireless power supply apparatus 10 communicates with the power receiving terminal 20 alone, the present invention is not limited to this case. For example, there may be a case where the wireless power supply apparatus 10 operates as a base station of a wireless local area network (LAN), for example, in which the wireless power supply apparatus 10 may have another communication party other than the power receiving terminal 20. In the present embodiment, the wireless power supply apparatus 10 that communicates with a plurality of terminals will be described.

Figure 8:
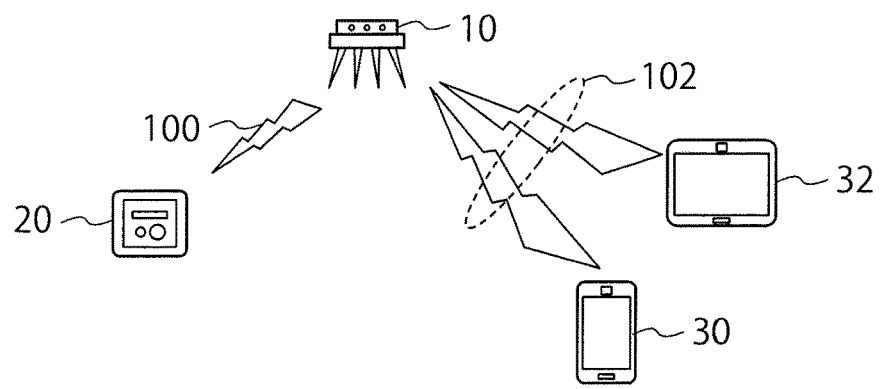
FIG. 8 is a diagram schematically illustrating wireless communication and wireless power supply according to an embodiment.

FIG. 8 is a diagram illustrating communication between the wireless power supply apparatus 10 and the power receiving terminal 20 according to the present embodiment. As described above, the wireless power supply apparatus 10 and the power receiving terminal 20 wirelessly communicate with each other using the radio waves of the first frequency 100 and perform power supply and power reception using the radio waves of the second frequency 102. In the present embodiment, wireless power supply in the above-described embodiment is performed while second wireless communication with other communication terminals 30 and 32 (second terminals) or the like is performed using the radio waves of the second frequency 102.

While two communication terminals, namely, the communication terminal 30 and the communication terminal 32 are used herein as an example, and the number of communication terminals may be one, or three or more (plurality of terminals). Moreover, the wireless communication with the power receiving terminal 20 and the wireless communication with the communication terminals 30 and 32 may be performed simultaneously or sequentially.

Figure 9:
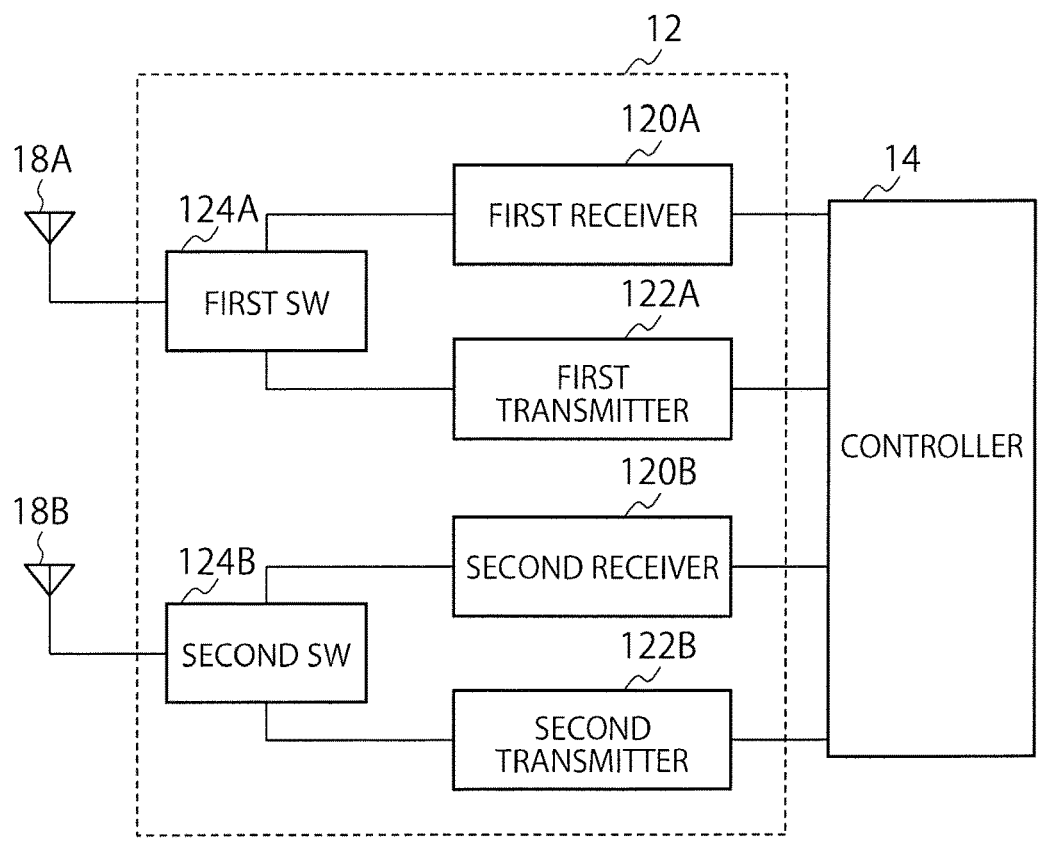
FIG. 9 is a block diagram illustrating communication and control functions of a wireless power supply apparatus according to an embodiment.

FIG. 9 is a block diagram illustrating functions of the communicator 12 and the controller 14 of the wireless power supply apparatus 10 illustrated in FIG. 2 with respect to the wireless power supply apparatus 10 according to the present embodiment. As illustrated in FIG. 2, the communicator 12 includes the receiver 120 and the transmitter 122. Moreover, as illustrated in FIG. 9, the receiver 120 falls into a first receiver 120A and a second receiver 120B, while the transmitter 122 falls into a first transmitter 122A and a second transmitter 122B. The communicator 12 further includes a first switch (SW) 124A and a second switch (SW) 124B to switch connections between the antenna and these transmitter/receivers.

Each of the first receiver 120A, the first transmitter 122A, the second receiver 120B, and the second transmitter 122B is connected to the controller 14 and the controller 14 controls these. For example, in a case where communication with the power receiving terminal 20 is performed using the radio waves of the first frequency 100, the communication is performed by the control by the controller 14 of the first receiver 120A and the first transmitter 122A. The first switch 124A receives communication from the outside to the first receiver 120A, or receives communication from the first transmitter 122A to the outside, and switches the antenna 18A appropriately.

Communication is performed similarly in the case of the second receiver 120B, the second transmitter 122B, the second switch 124B, and the antenna 18B.

With this control by the controller 14, as illustrated in FIG. 8, the wireless power supply apparatus 10 wirelessly supplies power to the power receiving terminal 20 using the second frequency 102, and performs wireless communication with the communication terminals 30 and 32 (second wireless communication), while performing wireless communication with the power receiving terminal 20 using the first frequency 100. While the controller 14 performs the control, it is allowable that the communicator 12 includes a communication controller and allows the communication controller to perform the control related to the communicator 12.

While each of the antenna 18A and the antenna 18B is illustrated as a single antenna, there is no limitation and the antenna may be an array antenna including a plurality of antenna elements. In the case of performing any of the above-described position estimation, the antenna configuration may be adapted to the position estimation.

Figure 10:
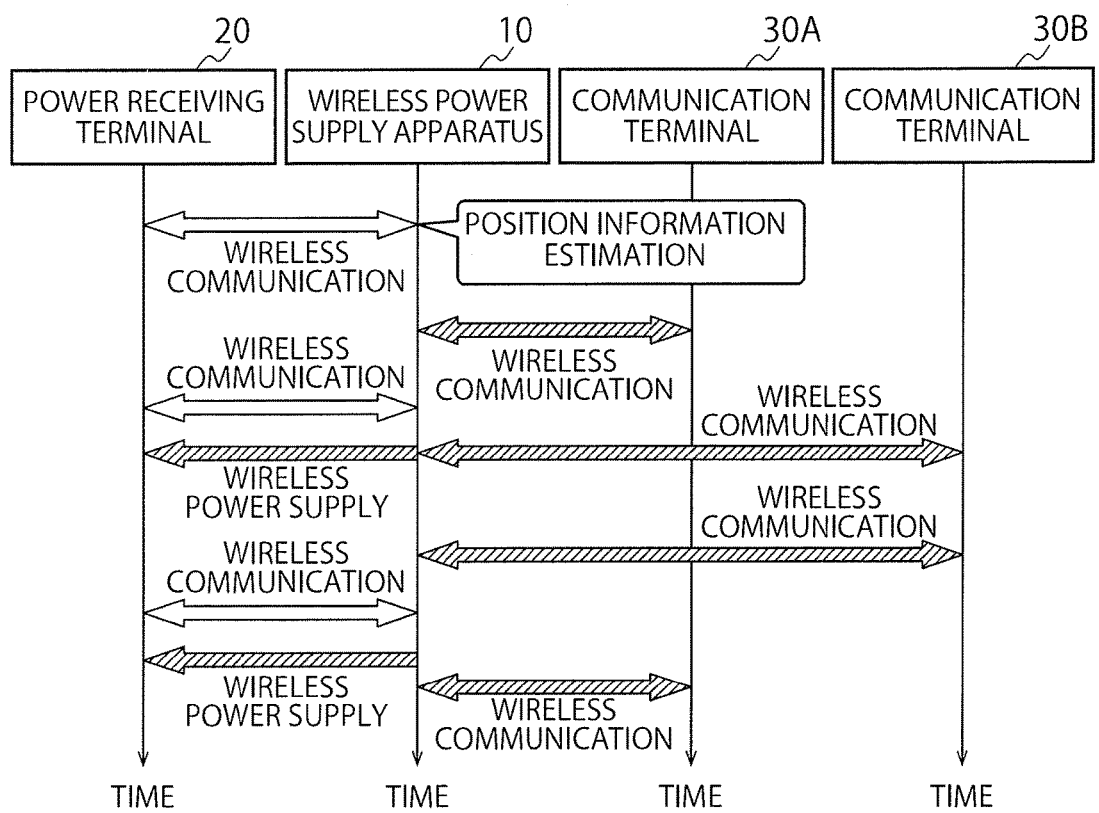
FIG. 10 is a diagram illustrating an example of timing of wireless communication and wireless power supply according to an embodiment.

FIG. 10 is a diagram illustrating timings of wireless communication and wireless power supply according to the present embodiment. The open arrows represent wireless communication at the first frequency 100, and the hatched arrows represent wireless power supply or wireless communication at the second frequency 102.

The wireless power supply apparatus 10 performs wireless communication with the power receiving terminal 20 via the first frequency 100 to estimate the position information or direction information of the power receiving terminal 20. On the other hand, the wireless power supply apparatus 10 performs wireless communication with communication terminals 30A and 30B via the second frequency 102. The wireless power supply apparatus 10 controls communication volume and the communication timings toward individual terminals in accordance with the traffic and the radio wave environment with the communication terminals 30A and 30B. The communication with each of the terminals may be performed serially, performed simultaneously in multiplex communication, or performed by broadcast communication.

While wirelessly communicating with the communication terminals 30A and 30B, the wireless power supply apparatus 10 wirelessly supplies power to the power receiving terminal 20 using the radio waves of the second frequency 102 during an idle time. In this case, the wireless power supply apparatus 10 performs wireless power supply with directivity in the direction of the power receiving terminal 20 on the basis of the position information estimated via wireless communication at the first frequency 100. This processing makes it possible to achieve wireless communication and wireless power supply system with excellent frequency utilization efficiency. That is, it is possible to perform high-efficiency wireless power supply with directivity in the direction of the power receiving terminal 20 without interfering with wireless communication with the power receiving terminal 20.

Furthermore, the power supply timing to the power receiving terminal 20 is scheduled during wireless communication with the communication terminals 30A and 30B, makes it possible to efficiently perform wireless communication and wireless power supply via the second frequency 102.

There is no need to separate the wireless communication time from the wireless power supply time. That is, the wireless power supply apparatus 10 may wirelessly supply power to the power receiving terminal 20 while wirelessly communicating with the communication terminals 30A and 30B at a same timing.

In this case, as a more specific situation, the wireless communication at the first frequency 100 between the wireless power supply apparatus 10 and the power receiving terminal 20 may preferably be wireless communication with lower power consumption and narrower band than the wireless communication via the second frequency 102. The reason is that due to limitation of the amount of power that can be supplied in the wireless power supply using radio waves, devices with lower power consumption are more likely to receive benefits relatively, and that the narrower the bandwidth of the frequency used for the wireless communication, the higher the resolution of orientation estimation, and more advantageous. In contrast, the communication via the second frequency 102 may preferably be communication with relatively higher power than the communication via the first frequency 100 because wireless power supply is performed with the communication via the second frequency 102.

As an example, the first frequency 100 may be a frequency band of the 2.4 GHz band, and the second frequency 102 may be a frequency band of the 5 GHz band. The 2.4 GHz band is a band commonly available as the ISM band in various countries around the world and with which many low power consumption devices are compatible. While even lower frequency bands such as the 900 MHz band are conceivable as frequency bands for low power consumption devices, this would increase the antenna size for orientation estimation. Accordingly, the frequency band of the 2.4 GHz band would be more suitable for orientation estimation. Additionally, since the 5 GHz band is not currently congested as much as the 2.4 GHz band, having advantages of wide band availability and less interference with other communication equipment. In view of reception processing of the wireless communication of the power receiving terminal 20 and power reception processing of the wireless power supply, it is also possible to share the antenna in the 2.4 GHz band and the 5 GHz band.

As an exemplary communication method, it is conceivable to use communication using Bluetooth low energy ((BLE): registered trademark) in the 2.4 GHz band, and using wireless LAN such as Wi-Fi (registered trademark) in the 5 GHz band. The BLE is widely used as a wireless communication for low power consumption devices. The BLE uses the bandwidth of 1 MHz, making it possible to perform highly accurate orientation estimation.

Furthermore, the standard Bluetooth 5.0 including technical use of the BLE defines an orientation estimation function by the BLE. In contrast, a wireless LAN is a wireless communication widely spread equally or beyond the BLE and to which a beam-forming technology using a plurality of antennas is defined as its standard specification. This would easily achieve directivity control in a specific direction.

Meanwhile, the Wi-Fi standard defines a multiple-input and multiple-output (MIMO) scheme using a plurality of antennas, making it easy to form a specific beam pattern. Therefore, in the present embodiment, the BLE is used as the first wireless communication using the first frequency 100 and Wi-Fi is used as the second wireless communication using the second frequency 102. With this configuration, it is possible to perform wireless power supply by forming an efficient beam pattern while estimating the position of the power receiving terminal 20 as a power supply target with high accuracy.

The above description is merely an example, and the present invention is not limited to this example. In a case where the limitation of the band is changed in the future, it is also possible to perform wireless communication or wireless power supply with a more suitable communication method using a more suitable frequency band in addition to the above.

Figure 11:
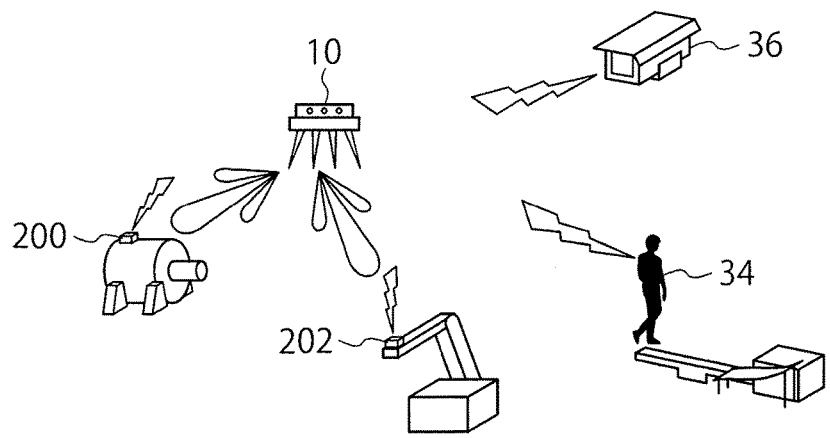
FIG. 11 is a diagram illustrating a usage example of a wireless power supply apparatus according to an embodiment.

FIG. 11 illustrates a usage example of the wireless power supply apparatus 10 compatible with both the BLE and the wireless LAN. This example of the wireless power supply apparatus 10 assumes an information collection terminal in a factory. Sensors 200 and 202 to monitor equipment in the factory transmit sensing results to the wireless power supply apparatus 10 via the BLE. Along with this, the wireless power supply apparatus 10 also performs high-capacity communication via the wireless LAN with a worker 34 in the factory, a monitoring camera 36, or the like. The wireless power supply apparatus 10 estimates the position and orientation of the sensors 200 and 202 via communication by BLE and performs wireless power supply based on the wireless LAN toward that direction. Communication by wireless LAN is packet communication, and it is performed intermittently. The wireless power supply apparatus 10 schedules timings of wireless power supply to each of the sensors 200 and 202 with traffics with the worker 34 or the monitoring camera 36 in view, making it possible to achieve both wireless communication and wireless power supply efficiently.

As described above, according to the present embodiment, it is possible to achieve the wireless power supply apparatus 10 that wirelessly communicates with the power receiving terminal 20 via the first frequency 100, while supplying power to the power receiving terminal 20 via the second frequency 102 and wirelessly communicates with the other communication terminals 30 and 32.

As illustrated by the sensors 200 and 202, the power receiving terminal 20 is a device with relatively low power consumption. In contrast, the communication terminal 30 that performs wireless communication via the second frequency 102 may be a tablet possessed by the worker 34 or a communication terminal for quality control, for example, and these need no wireless power supply. Accordingly, the power consumption of these may be greater than that of the power receiving terminal 20. In this manner, the wireless power supply apparatus 10 is applicable to enable wireless power supply to a terminal that is a less power-consuming sensor or the like, having difficulty in charging, and in which no interruption of power charge is desirable.

Note that the description in the present embodiment of the frequency band and the power consumption of the first frequency 100 and the second frequency 102 can also apply to the above-described first embodiment. That is, also in the first embodiment, by setting the first frequency 100 to the frequency of the 2.4 GHz band and the second frequency 102 to the frequency of the 5 GHz band, it is possible to obtain the similar effect as the above-described effect.

Third Embodiment

In the second embodiment described above, wireless communication and wireless power supply are performed independently of the positional relationship between the power receiving terminal 20 and the communication terminals 30 and 32. In contrast, the present embodiment is a case of implementing wireless communication and the wireless power supply efficiently in accordance with positions of the power receiving terminal and the communication terminal.

Figure 12:
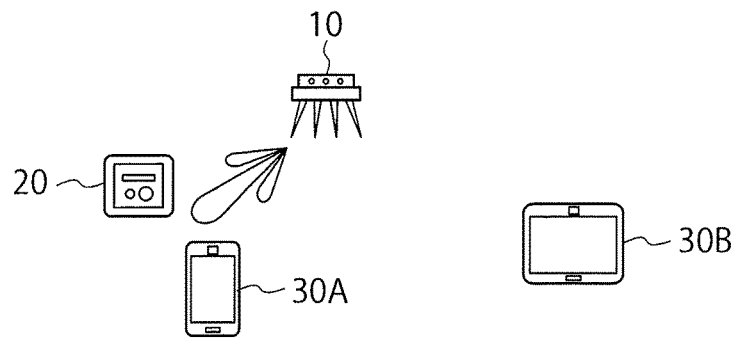
FIG. 12 is a diagram schematically illustrating wireless communication and wireless power supply according to an embodiment.

FIG. 12 is a diagram illustrating a usage example of wireless communication and wireless power supply according to the present embodiment. The wireless power supply apparatus 10 further includes a function of identifying a communication terminal existing in the vicinity of the power receiving terminal 20 or in the same direction in addition to estimating the position of the power receiving terminal 20. In this case, the terminals as the target of wireless communication other than the power receiving terminal 20 include the communication terminal 30A and the communication terminal 30B.

For example, it is assumed that the power receiving terminal 20 and the communication terminal 30A are in the vicinity of each other. The wireless power supply apparatus 10 wirelessly communicates with the communication terminal 30A via radio waves of the second frequency 102 and performs wireless power supply to the power receiving terminal 20 via the same radio waves. That is, unlike the above-described second embodiment, the wireless power supply apparatus 10 wirelessly supplies power to the power receiving terminal 20 while performing wireless communication with the communication terminal 30A vie the same radio waves.

Figure 13:
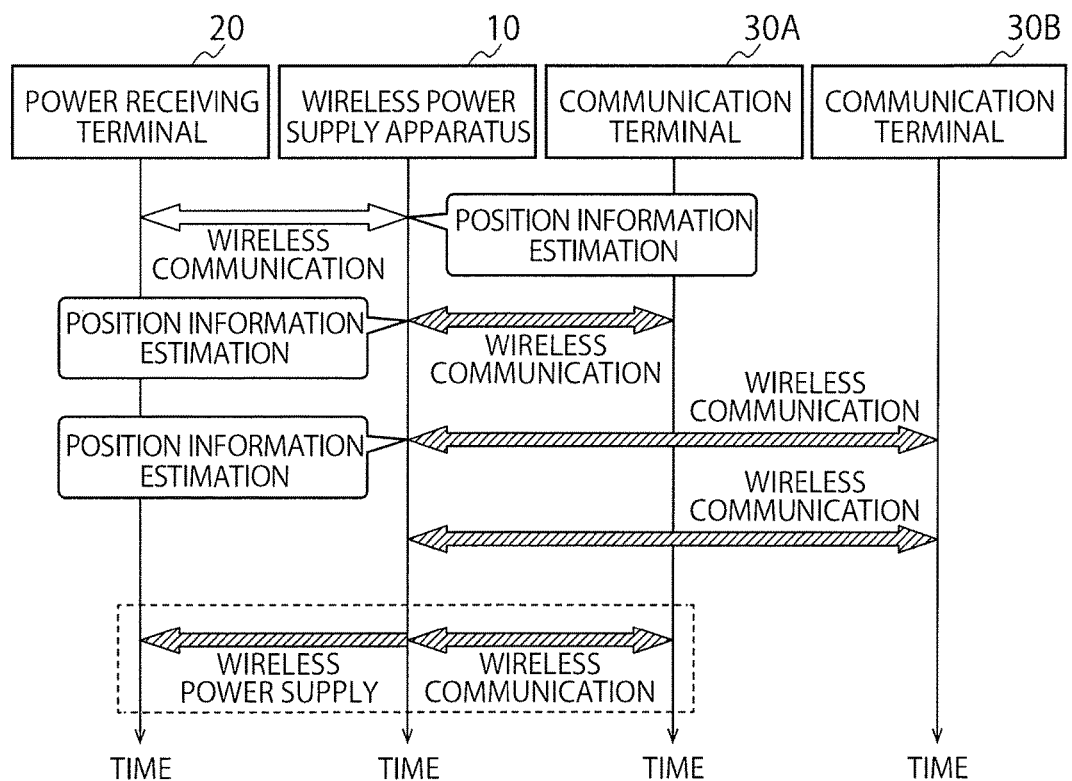
FIG. 13 is a diagram illustrating an example of timing of wireless communication and wireless power supply according to an embodiment.

FIG. 13 is a diagram illustrating timings of wireless communication and wireless power supply according to the present embodiment. The open arrows and hatched arrows have the similar meaning as in the FIG. 10. The wireless power supply apparatus 10 estimates the position of the power receiving terminal 20 via the radio waves of the first frequency 100 and then, wirelessly communicates with the communication terminals 30A and 30B via the radio waves of the second frequency 102, while estimating the position of the communication terminals 30A and 30B. As illustrated in FIG. 12, it is assumed that the power receiving terminal 20 and the communication terminal 30A are positioned in the vicinity of each other.

In this case, the wireless power supply apparatus 10 performs wireless power supply to the power receiving terminal 20 and communication with the communication terminal 30A using the same beam on the basis of a position estimation result of the power receiving terminal 20 and the communication terminals 30A and 30B. In FIG. 13, wireless power supply and wireless communication via the radio waves of the second frequency 102 surrounded by a broken line indicate that the same beam is used.

As described above, according to the present embodiment, the wireless power supply apparatus 10 can perform wireless power supply to the power receiving terminal and wireless communication with the communication terminal in the vicinity using the same beam, making it possible to enhance radio wave utilization efficiency, namely, the frequency utilization efficiency. In a case where there is no communication terminal in the vicinity of the power receiving terminal 20, it is sufficient to perform operation similar to the operation in the above-described second embodiment.

Note that while FIG. 10 illustrates a situation in which the wireless power supply to the power receiving terminal 20 and the wireless communication with the communication terminal 30B are performed at the same timing, this uses separate beams, and is different from the wireless communication and the wireless power supply according to the present embodiment.

Fourth Embodiment

The following is description of the present embodiment, being a case where a wireless power supply system in which the power receiving terminal 20 determines whether power shortage occurs on the power receiving terminal 20 and issues a power supply request to the wireless power supply apparatus 10.

The power receiving terminal 20 determines whether to issue a power supply request signal on the basis of the residual capacity of its own battery or the power reception amount of the power receiving terminal 20. The power supply request signal may be 1-bit information indicating the presence or absence of the power supply request, or may be information indicating the residual capacity of the battery. Alternatively, the format of wireless communication may be changed in a specific case where power supply is desired. For example, in communication at the first frequency 100 using BLE as wireless communication, it is allowable to transmit a packet including a supplemental field defined for direction estimation when power supply is needed and to transmit a packet not including the supplemental field in a case where power supply is not needed.

Figure 14:
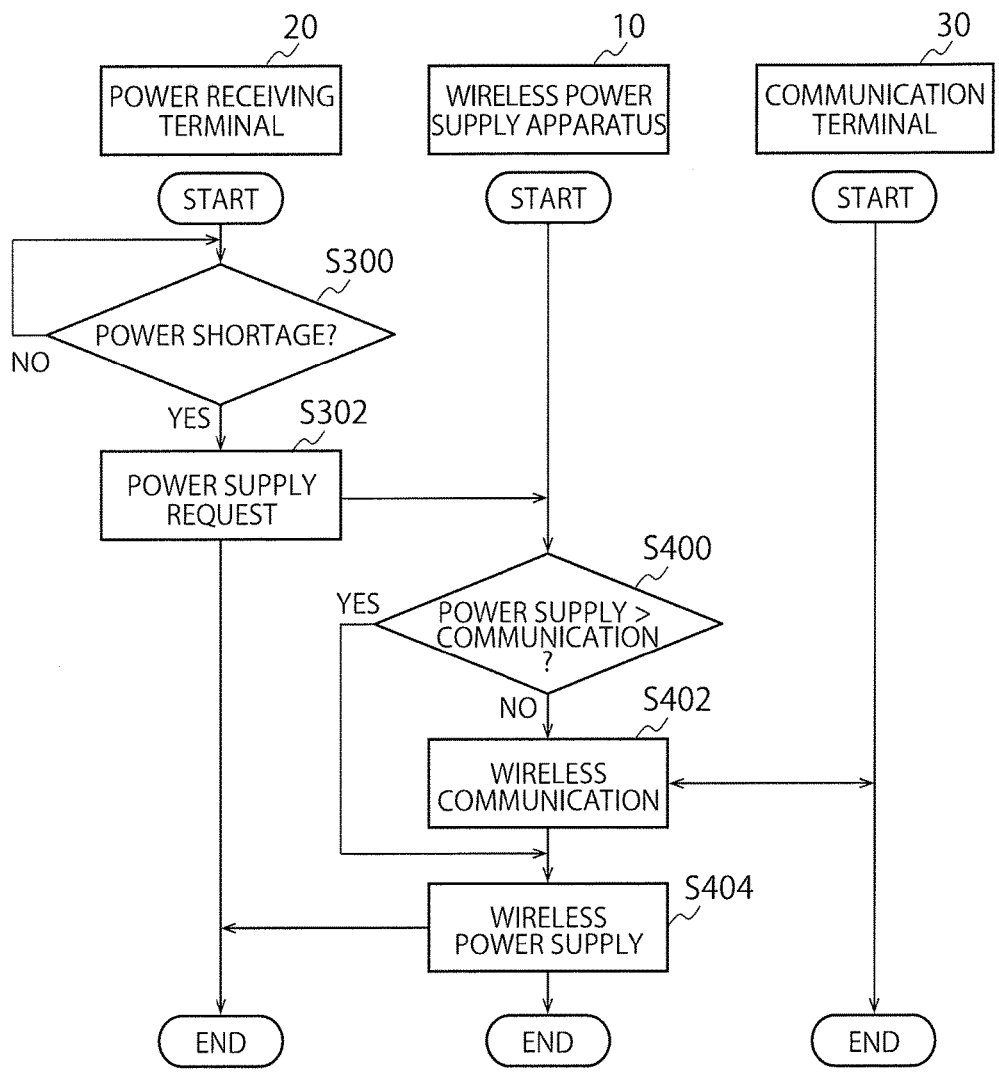
FIG. 14 is a flowchart illustrating wireless communication and wireless power supply processing according to an embodiment.

FIG. 14 is a flowchart illustrating processing of the wireless power supply system according to the present embodiment. The power receiving terminal 20 performs wireless communication with the wireless power supply apparatus 10 via the first frequency 100. It is assumed that the wireless power supply apparatus 10 estimates the position of the power receiving terminal 20 via the first frequency 100 at an arbitrary timing as in each of the above embodiments.

The power receiving terminal 20 determines at a predetermined timing whether the power shortage occurs (S300). In a case where no power shortage occurs, the wireless communication with the wireless power supply apparatus 10 via the first frequency 100 is continued.

In contrast, in a case where it is determined that the power shortage occurs (S300: Yes), the power receiving terminal 20 transmits a request signal to the wireless power supply apparatus 10 to supply power (S302). As described above, this request signal is transmitted via the radio waves of the first frequency 100. In a case where the power supply is not performed despite the transmission of the power supply request, transmission of the power supply request may be more frequently, for example. In a case where the power supply state of the power receiving terminal 20 is to be grasped on the basis the above-described residual capacity of battery or the like instead of the power supply request, it is allowable to omit S300 and send the residual capacity of battery information to the wireless power supply apparatus 10 as the processing of S302 at a predetermined timing.

Upon receiving the power supply request, the wireless power supply apparatus 10 determines whether the priority of power supply is higher than the priority of other processing (S400). The other processing is, for example, processing such as wireless communication with the other communication terminal 30 via the second frequency 102. In a case where the power receiving terminal 20 is transmitting information such as the residual capacity of the battery of the power receiving terminal 20, the priority may be determined on the basis of the information such as the residual capacity of the battery. In a case where the power supply request is being transmitted, the priority of a predetermined power supply request may be used, or the priority may be determined on the basis of information such as the frequency per unit time of transmission of the power supply request.

For example, in a case where the priority of wireless communication with the communication terminal 30 is higher than the priority of power supply (S400: No), the wireless power supply apparatus 10 first communicates with the communication terminal 30 (S402).

After communication with the communication terminal 30 or in a case where the priority of power supply is higher than that of other processing (S400: Yes), the wireless power supply apparatus 10 supplies power to the power receiving terminal 20 via the second frequency 102 (S404). In this manner, it is allowable to allow the wireless power supply apparatus 10 to first obtain some information related to power supply from the power receiving terminal 20, and then to perform wireless power supply.

The timing of the wireless power supply may be controlled on the basis of the information notified by the power receiving terminal 20 in the form of a power supply request and on the basis of the data traffic with the communication terminal 30. For example, in a case where it is determined that the battery of the power receiving terminal 20 is nearly exhausted, wireless power supply is performed preferentially, and if not, wireless communication with the communication terminal 30 is first performed and then wireless power supply is performed toward the power receiving terminal 20.

As described above, according to the present embodiment, the timing of wireless power supply is determined with consideration of fairness between wireless power supply and other processing such as wireless communication. With this configuration, it is possible to maximize capability of responding to other processing, for example, a communication request from other communication terminal 30 without causing exhaustion of the battery of the power receiving terminal 20.

According to these embodiments, it is possible to use the wireless power supply apparatus 10 to prolong the battery life of a low power consumption device to which compactness and low power consumption are demanded or to achieve battery-less drive of the device.

The components of the wireless power supply apparatus of the present embodiments may be implemented by dedicated hardware such as an integrated circuit (IC) on which a processor or the like is mounted. For example, the wireless power supply apparatus 10 may include a reception circuit to implement the receiver 120, a transmission circuit to implement the transmitter 122, and a control (processing) circuit as a controller to implement the controller 14. The internal configuration of the controller may also be implemented by a dedicated circuit. Alternatively, the components may be implemented using software (a program). In the case of using software (program), the above-described embodiments can be implemented by using a general-purpose computer apparatus as basic hardware and causing a processor such as a central processing unit (CPU) mounted on the computer apparatus to execute the program. In a case where a portion of the function is configured by software, a program to implement at least a portion of the function of the wireless power supply apparatus 10 may be stored in a recording medium such as a flexible disk and a CD-ROM to be loaded on a computer to be executed. The recording medium is not limited to a detachable one such as a magnetic disk and an optical disk, and may be a fixed type recording medium such as a hard disk apparatus and a memory.

Moreover, a program to implement at least a portion of the function of the wireless power supply system 1 may be distributed via a communication channel (including radio communication) such as the Internet. Furthermore, the program may be encrypted, modulated, or compressed, and then distributed via a wired or radio channels including the Internet, or may be stored in a recording medium to be distributed.

The terms used in the present embodiment are to be interpreted broadly. For example, the term "processor" may include a general-purpose processor, a central processing unit (CPU), a microprocessor, a digital signal processor (DSP), a controller, a microcontroller, and a state machine. Depending on the situation, the "processor" may refer to an application specific integrated circuit (ASIC), a field programmable gate array (FPGA), a programmable logic circuit (PLD), or the like. The "processor" may refer to a combination of processing apparatuses such as a plurality of microprocessors, a combination of a DSP and a microprocessor, and one or more microprocessors cooperating with a DSP core.

As another example, the term "memory" may include any electronic component capable of storing electronic information. The "memory" can be a random access memory (RAM), read only memory (ROM), programmable read only memory (PROM), erasable programmable read only memory (EPROM), electrically erasable PROM (EEPROM), nonvolatile random access memory (NVRAM), flash memory, magnetic or optical data storage, being readable by the processor. In a case where the processor executes both or one of reading and writing of information onto the memory, this can be referred to as electric communication of the memory with the processor. The memory may be integrated into the processor, and this case can also be referred to as electric communication of the memory with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
   transmitter circuitry configured to transmit a first wireless signal for wireless communication to a first terminal via a first frequency band;
   receiver circuitry configured to receive a second wireless signal for wireless communication from the first terminal via the first frequency band; and
   controller circuitry configured to:
      detect first position information of the first terminal based on the second wireless signal; and
      form a first beam pattern of first radio waves of a second frequency band different from the first frequency band based on the first position information, the first beam pattern having directivity to the first terminal,
   wherein the transmitter circuitry is further configured to wirelessly supply power to the first terminal via at least part of the second frequency and during at least part of a wireless communication period with the first terminal,
   wherein the transmitter circuitry is further configured to transmit a third wireless signal for wireless communication with a second terminal different from the first terminal via at least part of the second frequency band.

2. The electronic apparatus according to claim 1, wherein the transmitter circuitry is further configured to perform wireless communication with a frequency bandwidth of the second wireless signal being wider than a frequency bandwidth of the first wireless signal.

3. The electronic apparatus according to claim 1, wherein a power consumption of the first terminal is smaller than a power consumption of the second terminal.

4. The electronic apparatus according to claim 1, wherein the transmitter circuitry is configured to perform wireless communication using Bluetooth low energy (BLE) for the first wireless signal and perform wireless communication using Wi-Fi for the second wireless signal.

5. The electronic apparatus according to claim 1, wherein the controller circuitry is configured to control a power supply timing based on a power supply request signal from the first terminal and communication data traffic with the second terminal.

6. An electronic terminal configured to perform wireless communication with the electronic apparatus according to claim 1 and configured to receive a power supply signal from the electronic apparatus.

* * * * *